United States Patent [19]

Munk

[11] 3,709,646
[45] Jan. 9, 1973

[54] APPARATUS FOR PRODUCING COMPRESSION-MOLDED ARTICLES

[75] Inventor: Edmund E. Munk, Oberstenfeld, Germany

[73] Assignee: Furnier-und Sperrholzwerk J. F. Weg Jr. K. G., Werzalit-Pressholzwerk, Oberstenfeld, Germany

[22] Filed: April 29, 1971

[21] Appl. No.: 138,667

Related U.S. Application Data

[62] Division of Ser. No. 883,432, Dec. 9, 1969, abandoned.

[52] U.S. Cl. .................425/217, 264/109, 425/424, 425/110
[51] Int. Cl. ..............................................B29c 29/00
[58] Field of Search......425/123, 110, 424, 256, 217; 264/103, 109

[56] References Cited

UNITED STATES PATENTS

| | | | |
|---|---|---|---|
| 2,347,971 | 5/1944 | Sagne | 426/261 X |
| 2,559,545 | 7/1951 | Penrod | 425/801 X |
| 2,621,363 | 12/1952 | Fienberg et al. | 425/260 X |
| 3,268,642 | 8/1966 | Hutter | 425/455 X |
| 3,555,605 | 1/1971 | Angelotti et al. | 425/155 |

*Primary Examiner*—Robert L. Spicer, Jr.
*Attorney*—Michael S. Striker

[57] ABSTRACT

An apparatus for simultaneously filing a plurality of mold compartments of different depths to substantially the same upper level by moving a filling machine over a filling gate which is provided with apertures the lower outlet ends of which are in vertical alignment with the upper end s of the mold compartments, and in which one or more of the walls of the aperture through which a deeper mold compartment is to be filled are inclined so that the mixture will also fall thereon and then slide into the deeper compartment so as to compensate for the greater depth of this compartment.

3 Claims, 5 Drawing Figures

PATENTED JAN 9 1973 3,709,646

Edmund E. Munk
INVENTOR.

BY
ATTORNEY

Edmund E. Munk
INVENTOR.

APPARATUS FOR PRODUCING COMPRESSION-MOLDED ARTICLES

CROSS-REFERENCE TO RELATED APPLICATION

This application is a division of my copending application Ser. No. 883,432, now abandoned filed Dec. 9, 1969, and entitled "Method and Apparatus for Producing Compression-Molded Articles."

BACKGROUND OF THE INVENTION

The present invention relates to an apparatus for molding articles under compression in a mold which is filled with a mixture of comminuted fibrous materials, for example, wood chips, and a binder, for example, a hot-setting synthetic resin, and which is then compressed in the mold either in a cold condition for producing blanks of the desired articles or by the simultaneous application of heat for directly producing the desired articles. The molds and the apparatus for filling the same should also permit the production of molded articles of intricate shapes or with parts of different thicknesses or of several equal or different articles simultaneously at each molding stroke of a common die or of a ram which is provided with a plurality of different dies.

Prior to this invention, it was conventional to fill the molding mixture by hand into the mold or at least to distribute it therein by hand. Apart from the fact that this filling method does not permit the mixture to be uniformly distributed within the mold, it is also a complicated and very time-wasting operation and requires specially trained personnel.

In order to overcome these disadvantages of a manual filling operation, a mechanical filling method has already been proposed in which the bottom mold is divided into a plurality of mold compartments of a simple geometrical shape. For filling these individual compartments, the required amount of material must first be filled at a position remote from the mold into a corresponding number of filling hoppers which are then moved successively to the positions above the different compartments and are then emptied into the latter, whereupon these hoppers are moved to their former positions to be refilled. Although this filling operation may be carried out more or less automatically, it requires a considerable length of time since it actually amounts to two filling operations, namely, of first filling the hoppers and of then filling the mold compartments from these hoppers. Furthermore, this method is not suitable for properly filling molds of a more intricate shape or of filling several mold compartments of different shapes simultaneously.

SUMMARY OF THE INVENTION

It is an object of the present invention to provide an apparatus which permits the mold to be filled very quickly and fully automatically. According to the invention, this filling operation is to be carried out by a distributing apparatus of a type similar to that as employed in the textile art for producing a homogeneous fleece. During the filling operation, this distributing apparatus is moved once or several times back and forth over the mold to be filled and, according to one important feature of the invention, a filling gate is provided between the distributing apparatus and the mold through which the molding mixture is guided so as to pass by gravity into the different parts or compartments of the mold.

Another important feature of the invention consists in providing at least some of the walls or wall portions of the apertures of the gate through which the molding mixture is passed into the mold with funnel-like surfaces which are downwardly and inwardly inclined at suitable angles in accordance with different amounts of molding material which might be required for filling the particular mold or mold compartments.

Another feature of the invention consists in designing the filling gate so as to permit the walls defining the gate apertures to be adjustable to different angles for regulating the quantity of material which is to be filled into each mold compartment.

If the mold is divided into a plurality of compartments in which separate elements are to be molded simultaneously and which previously have been filled successively through the gate apertures by the same distributing apparatus moving back and forth over the gate, it is another feature of the invention to prevent any of the mold compartments from being filled improperly or excessively by designing the walls defining the gate apertures so as also to form the walls of chambers which are open at their upper ends and are adapted to receive the molding mixture which should not pass through the gate apertures into the mold compartments underneath. According to another feature of the invention, a suitable mechanism is provided for tilting over the entire gate after it has been laterally retracted from the mold after the filling operation so as to empty these gate chambers and to return the molding material to the bin from which the distributing apparatus is supplied.

According to a further feature of the invention, a method using the new apparatus is preferably carried out very economically by employing two molds which are alternately movable horizontally to and away from a position underneath the vertically movable male dies of the press so that while one mold is filled by the filling apparatus, the material in the compartments of the other mold is being compressed. If the two molds are designed so that the upper surfaces of the material to be compressed in all compartments of each mold are disposed substantially at the same level and the frame forming the side walls of all compartments of each mold may be depressed against spring action by a common male die during the compression stroke of the latter, the compartments in each mold may also be of a size and shape different from those of the compartment of the other mold.

These and numerous additional features and advantages of the present invention will become more clearly apparent from the following detailed description thereof which is to be read with reference to the accompanying diagrammatic drawings.

DESCRIPTION OF THE PREFERRED EMBODIMENTS

Figure 1:
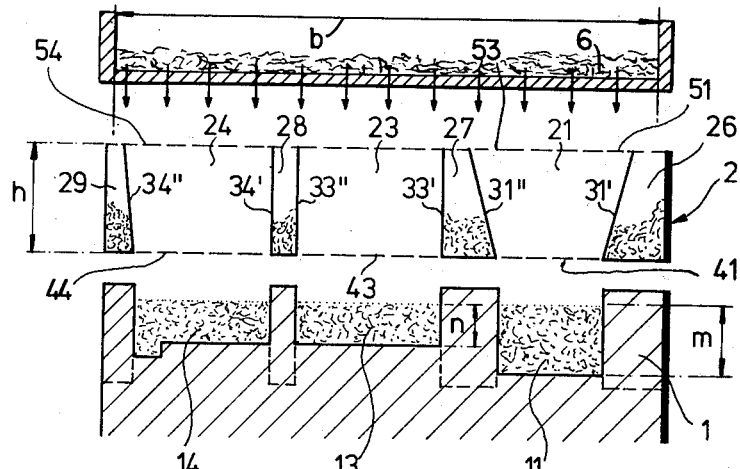
FIG. 1 shows a vertical section of a bottom mold and the associated gate, this section being taken along the line I—I of FIG. 2.
Figure 2:
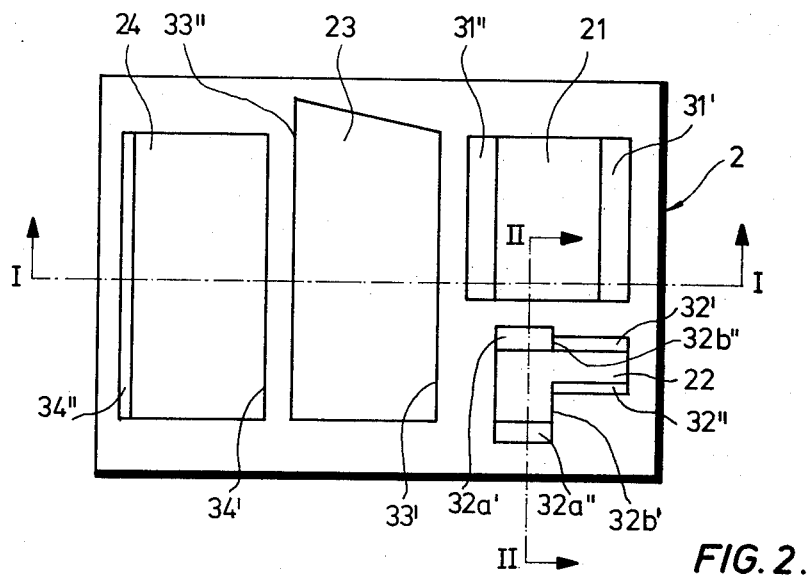
FIG. 2 shows a top view of the filling gate according to FIG. 1.

In the drawings it is assumed that the press according to the invention which comprises one or more vertically movable upper dies, not shown, and a bottom mold 1 which is movable horizontally from a filling position spaced from the press to a molding position underneath the upper die or dies is adapted to produce at each molding stroke a plurality of molded objects of different sizes and/or shapes, although they may, of course, also all be of the same size and shape. The bottom mold 1 is for this purpose divided into a plurality of mold compartments 11, 12, 13 and 14 of different depths so that the molding mixture has to be filled into the different compartments up to different heights, for example, to the heights $m$ and $n$. Although the upper surfaces of the material in the different mold compartments are illustrated as being disposed at substantially the same level, these levels may, of course, also differ from each other if the respective upper dies have different lengths.

Figure 3:
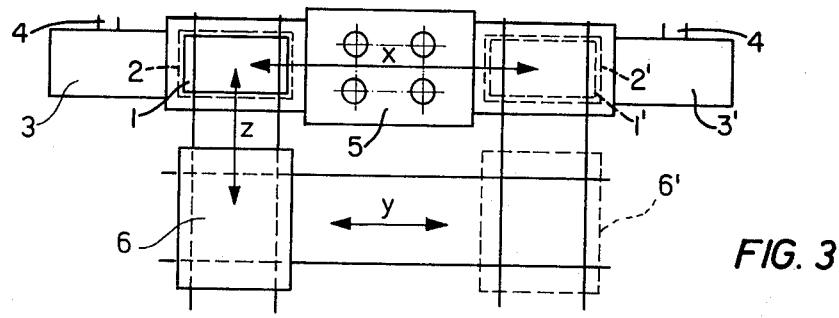
FIG. 3 shows diagrammatically the arrangement of two bottom molds which are alternately filled in one position and moved to another position underneath a male die unit.

For filling the molding mixture into the mold compartments 11 to 14 when the mold 1 is in its filling position laterally away from the press, a filling or distributing apparatus 6 may be employed which is of a type similar to that as used in the textile art for producing a homogeneous fleece. This filling apparatus 6 which is indicated only diagrammatically in FIGS. 1 and 3 is adapted to be moved once or repeatedly back and forth over the bottom mold 1, to thereby discharge the material from the filling apparatus as indicated by the arrows.

For carrying out the filling operation so as to fill each mold compartment 11 to 14 to the proper level, a filling gate 2 is interposed between the filling apparatus 6 and the bottom mold 1 and is preferably placed directly upon the latter. This filling gate 2 which has a rectangular shape with outer dimensions substantially equal to those of the mold 1 and has a height $h$ is provided with apertures 21, 22, 23, and 24 at least the lower ends of which 41, 42, 43, and 44 have the same shapes and dimensions as the open upper ends of the mold compartments 11, 12, 13, and 14, respectively, and should during the filling operation be in exact vertical alignment with the latter. These gate apertures are defined by the walls 31', 31'', 32', 32'', 32a', 33', 33'', 34', and 34'', respectively, which also form the side walls of chambers 26, 27, 28, and 29 which by being open at their upper ends are adapted to receive the excessive material which during the horizontal movement of the filling apparatus 6 is not dropped from the latter directly through the gate apertures 21, 22, 23, and 24 into the mold compartments 11, 12, 13, 14. These chambers 26 to 29 therefore prevent this excessive material from also falling through the gate apertures and from thereby falsifying the quantity of material which should be filled into each mold compartment.

Since the filling apparatus 6 moves at a uniform rate of speed back and forth over the filling gate 2 either in the direction of the double arrow $z$ or at a right angle thereto and distributes the molding material at least within the distance indicated by this double arrow, the material which would be deposited in all mold compartments which have a flat bottom and the same depth and side walls extending at a right angle to the bottom would fill these compartments to the same upper level. However, since in the particular embodiment of the mold as illustrated in the drawings each of the mold compartments 21, 22, and 24 has at least partly a greater depth than the compartment 23, for example, the depth $m$ as compared with the depth $n$, but the material which is deposited in all compartments of the mold should reach approximately a uniform upper level, the invention provides the side walls 31' and 31'' of the gate aperture 21, the side walls 32', 32'', 32a', and $=a''$ of the gate aperture 22, and the side wall 34'' of the gate aperture 24 to be outwardly inclined in the upward direction at an angle which depends upon the greater amount of material which the respective mold compartment or compartment part should receive. The upper openings 51, 52, and 54 of these gate apertures 21, 22, and 24 are therefore larger than their lower openings 41, 42, and 44. Only the walls of the gate apertures, for example, the walls 33', 33'', and 34', which are located above the walls of those mold compartments or parts thereof into which the material is only to be filled up to the minimum level $n$ are disposed vertically to the remaining upper and lower surfaces of the frame of gate 2. The speed of the reciprocating movement of the filling apparatus 6 and its rate of dispersal of molding material should therefore be regulated in accordance with the minimum depth $n$ of the compartment 13 and of the largest part of the compartment 14. Since only a small part at the left side of this compartment 14 has a greater depth, only the side wall 34'' of the gate aperture 24 needs to be inclined.

Depending upon the size and shape of the respective mold compartment and the product to be molded, either one or both of the walls of the gate apertures 21 and 24 extending transverse to the direction of the double arrow 6 in FIG. 1 or one or both of the walls extending in this direction, for example, those of the aperture 22 for the mold compartment 12, or both the longitudinal and transverse walls of any gate aperture may be inclined at suitable angles. Since the mold compartment 12 has an angular shape, as seen in a plan view, the walls 32', 32'' and the walls 32a', 32a'' of the gate aperture 22 are inclined at different angles. In order to permit the quantity of molding material which is to be deposited in each mold compartment or adjacent to one or more of its side walls to be properly adjusted, the side walls of the different gate apertures are preferably movable to the most suitable inclinations and to be secured in such positions before a series of filling and molding operations is carried out.

After the filling operation is completed, mold 1 is moved laterally into the press itself to a position in which the walls of each mold aperture 11 to 14 are in vertical alignment with the outer surfaces of the upper dies (not shown). As indicated in FIG. 1 by dotted lines, the entire frame forming the lateral walls of the mold compartments may also be movable downwardly against spring action so that for simultaneously compressing the molding mixture in all compartments of one bottom mold 1 a single male die may be employed the lower surface of which has a size corresponding to the outer contour of the upper surface of the entire bottom mold.

FIG. 3 illustrates diagrammatically an apparatus which operates according to a shuttle method so as to carry out the filling and molding operations according to the invention as quickly and economically as possible. This apparatus comprises two molds 1 and 1' which are alternately filled through their associated filling gates 2 and 2' by the same filling or distributing apparatus 6 at the positions outside of the opposite sides of a press 5, for example, a so-called boxer press, and the filled molds 1 and 1' are then alternately moved into this press 5 in which the contents of the mold compartments of the respective mold are compressed by one or more upper dies, whereupon this mold is retracted from the press to permit the molded products to be removed from the mold compartments which may then be refilled for the next molding operation.

The shuttle method of operating this apparatus may be carried out in different manners. Thus, for example, the filling apparatus 6 may at first be moved from its initial full-line position as shown in FIG. 3 in the direction of the double arrow z at least once over the mold 1 and its associated gate 2 and back to its initial position so as to fill the mold compartments of this mold at the left side of the press 5. The filling apparatus 6 is then moved in the direction of the double arrow y to the dotted-line position 6' from which it is subsequently moved at least once back and forth over the filling gate 2' so as to fill the mold compartments of the mold 1' at the right side of press 5. During this time the filled mold is moved from its position underneath gate 2 into the press 5 in which the contents of its mold compartments are compressed, while at the same time the filling gate 2 is pivoted completely over and back about a horizontal axis in the manner as subsequently described so as to remove the molding material which during the previous filling operation has been collected on gate 2 and in the gate chambers of this gate, for example, the chambers 26 to 29 as shown in FIG. 1. In the meantime, mold 1' has been filled through gate 2' by the filling apparatus which, while this mold 1' moves away from the gate 2' into the press 5, moves from its position 6' back toward the left to its initial position for carrying out the next filling operation of mold 1.

Instead of moving the filling apparatus 6 back and forth in two different directions, that is, in the directions y and z, and the molds 1 and 1' in one direction x, the shuttle method may also be carried out by moving the molds 1 and 1' in two directions, that is, in the directions z and x, and the filling apparatus only in one direction, that is, in the direction y. The molds 1 and 1' would then be filled through the filling gates 2 and 2' when they are in the two positions underneath those in which the filling apparatus 6, 6' is indicated in FIG. 3. A third possibility of carrying out this shuttle method consists in mounting the filling apparatus in a fixed position, for example, centrally between its two positions 6 and 6' as shown in FIG. 3, and to move the molds 1 and 1' relative thereto for being filled, although this would also require the filling gates 2 and 2' to be moved together with the molds during a part of the movement of the latter. Finally, it is, of course, also possible to provide two filling apparatus 6 and 6' which then only have to move alternately back and forth in the direction z, while the molds only have to move back and forth in direction x.

Figure 4:
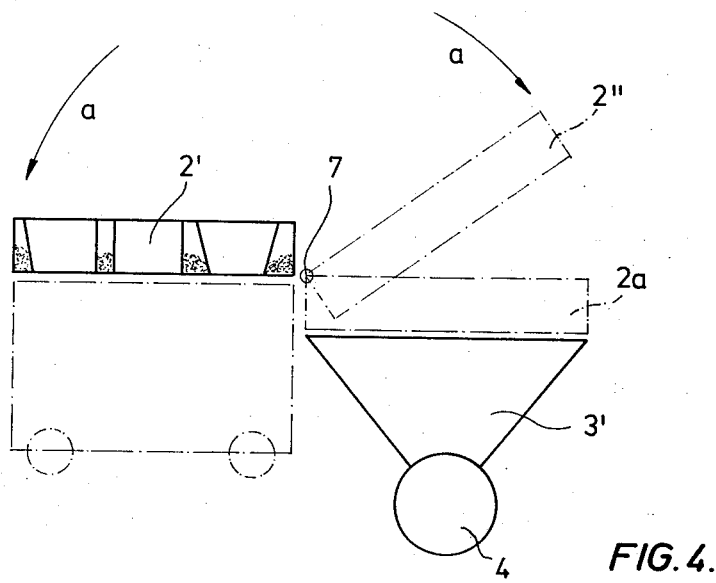
FIG. 4 illustrates the operation of emptying the chambers of the filling gate after each filling operation.
Figure 2A:
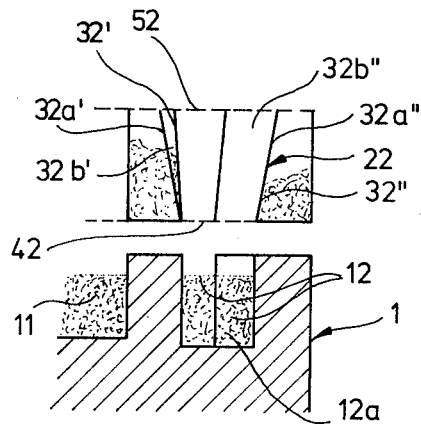
FIG. 2a shows a vertical section of a part of the mold according to FIG. 1 which is taken along the line II—II of FIG. 2.

FIG. 4 illustrates the operation of removing the excess molding material from the filling gates 2 and 2' which has been deposited thereon and collected in the gate chambers, for example, the chambers 26 to 29 as shown in FIG. 1, during the operation of filling the molds 1 and 1' through the gate apertures. As previously described with reference to the first shuttle method of operating the apparatus as illustrated in FIG. 3, this operation of emptying the gates 2 and 2' is carried out when the respective mold 1 or 1' after being filled has been moved underneath the associated gate 2 or 2' into the press 5. Gate 2 or 2' is then pivoted over completely about a horizontal axis 7 in the direction of the arrows a to the position 2'' in which it is located above a funnel-like hopper 3, so that all the molding material which has been collected in the gate chambers or on the remaining upper surfaces of the gate is dumped into this hopper 3 from which it is returned pneumatically through a channel 4 either into a main container (not shown) of the molding material from which the filling apparatus 6 is supplied or directly into the latter. The respective gate 2 or 2' then remains in this upside-down position 2a laterally away from its filling position until the molding operation in the press 5 has been completed and the mold 1 or 1' has been moved out of the press and back to its former position and the molded products have been removed from the mold. Thereafter the gate 2 or 2' is pivoted back to its filling position in the direction opposite to that as indicated by the arrows a, whereupon the next filling operation may be carried out.

If the gate chambers, for example, the chambers 26 to 29 as shown in FIG. 1, are to be omitted, for example, if the mold compartments are to be made of larger dimensions, the walls defining the gate apertures should terminate at their upper ends into sharp edges so that no molding material can be deposited thereon which might then fall into and through the gate apertures and falsify the quantity of material which should be deposited in the mold chambers.

As previously mentioned, the apparatus according to the present invention may be employed either for cold-molding or blanks which are subsequently molded once more and set in a second hot-molding process to the final dimensions and shapes of the desired articles or for hot-molding the desired articles in one operation. Either of the shuttle methods as previously described may be carried out at least semi-automatically and it is, for example, no longer necessary to employ two operators for filling the two molds, but a single operator will suffice to control the filling and molding operations. It is even possible to carry out all of the operations of the apparatus fully automatically and without any supervision.

The filling gates as previously described and illustrated diagrammatically in the drawings may also be modified extensively. Although it has previously been mentioned that the inclination of the walls of the gate apertures may be adjustable prior to the production of a series of molded articles, it may also be advisable to design these gates so as to permit the inclination of these walls to be varied during the production so as to increase or decrease the sizes of the upper openings relative to those of the lower openings of the gate apertures so that one part of a larger order of molded articles may, for example, be compressed to a higher degree of solidity than the other part. The gates may, however, also be designed so that the gate apertures are formed by the walls of funnels of fixed shapes which are removably secured within the frame of the gate so as to permit them to be exchanged for others.

Although my invention has been illustrated and described with reference to the preferred embodiments thereof, I wish to have it understood that it is in no way limited to the details of such embodiments but is capable of numerous modifications within the scope of the appended claims.

What is claimed as new and desired to be protected by Letters Patent is set forth in the appended

1. An apparatus for producing molded articles of a mixture of comminuted fibrous materials and a binder comprising at least one mold having at least two compartments therein of different depths and having open upper ends, at least one filling gate having at least two apertures with open upper inlet ends and open lower outlet ends, means for moving said mold and said gate back and forth relative to each other from positions laterally away from each other to a filling position in which the outlet ends of said gate apertures are located above and in vertical alignment with said upper ends of the associated compartments, at least one of the walls of said gate aperture which is located in said filling position above the deeper compartment being inclined so that said inlet end of said aperture is larger than its outlet end, a filling apparatus located at a level above said gate, and means for moving said filling apparatus and said mold including said gate in said filling position laterally relative to each other so that said filling apparatus passes at least once over said gate and said mold underneath said gate, said filling apparatus being adapted during said last relative movement to dispense said mixture at a uniform rate of distribution in a direction substantially transverse to said last movement and to drop a part of said mixture vertically through said gate aperture directly into said compartments and another part additionally upon said inclined wall along which said mixture then slides downwardly into said deeper compartment so as to compensate for the greater depth of said compartment.

2. An apparatus as defined in claim 1, in which when said mold contains more than two compartments of different depths, the degree of angularity of said inclined walls of said gate apertures which are associated with the deeper compartments increasing in a certain proportion to the increase in depth of one compartment over the depth of another compartment.

3. An apparatus as defined in claim 1, in which the walls defining said gate apertures also form at least some of the walls of chambers surrounding said apertures and being open at the upper side of said gate when in its filling position, said chambers being adapted to collect the excess of said mixture which during the relative movement between said filling apparatus and said gate does not fall directly from said filling apparatus through said gate apertures and upon at least said one inclined wall.

* * * * *